(12) United States Patent
Mateu

(10) Patent No.: US 6,868,141 B2
(45) Date of Patent: Mar. 15, 2005

(54) METHOD AND TELEPHONE AGENT SYSTEM FOR GENERATING A MESSAGE RECORD OF AT LEAST A PART OF A CONVERSATION BETWEEN TELEPHONE AGENTS AND FOR TRANSMITTING INFORMATION REGARDING THE MESSAGE RECORD TO THE TELEPHONE AGENT REQUESTING IT

(75) Inventor: Jordi Mateu, Puigcerda (ES)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/227,256

(22) Filed: Aug. 22, 2002

(65) Prior Publication Data
US 2003/0048884 A1 Mar. 13, 2003

Related U.S. Application Data
(60) Provisional application No. 60/314,044, filed on Aug. 22, 2001.

(51) Int. Cl.$^7$ ................................................ H04M 1/64
(52) U.S. Cl. ........................ 379/85; 379/266.1; 380/283
(58) Field of Search ......................... 379/81, 85, 88.08, 379/88.19, 88.22, 88.25, 266.1; 380/283

(56) References Cited

U.S. PATENT DOCUMENTS

| 5,533,103 | A | * | 7/1996 | Peavey et al. | ............ 379/88.22 |
|---|---|---|---|---|---|
| 5,535,256 | A | * | 7/1996 | Maloney et al. | .......... 379/88.08 |
| 5,923,746 | A | * | 7/1999 | Baker et al. | ............. 379/88.19 |
| 6,072,860 | A | * | 6/2000 | Kek et al. | ................. 379/88.25 |
| 6,222,909 | B1 | | 4/2001 | Qua et al. | |
| 6,529,602 | B1 | * | 3/2003 | Walker et al. | ............... 380/283 |

FOREIGN PATENT DOCUMENTS

| EP | 1 030 504 | 6/2000 |
|---|---|---|
| WO | WO 00/76188 | 12/2000 |
| WO | WO 01/52510 | 7/2001 |

* cited by examiner

Primary Examiner—Roland C. Foster
Assistant Examiner—Gerald Gauthier
(74) Attorney, Agent, or Firm—Bell, Boyd & Lloyd LLC

(57) ABSTRACT

A method and a telephone agent system are provided for establishing a call for conversation between telephone agents. The following steps (or units) are used: generating a message record of at least a part of the conversation between the calling telephone agent and the called telephone agents during the call; storing the message record in a database retrievable by request of the telephone agents; and transmitting information regarding the message record to a particular telephone agent who has requested it. Agreement to the message record should be declared by every telephone agent involved in the conversation.

25 Claims, 1 Drawing Sheet

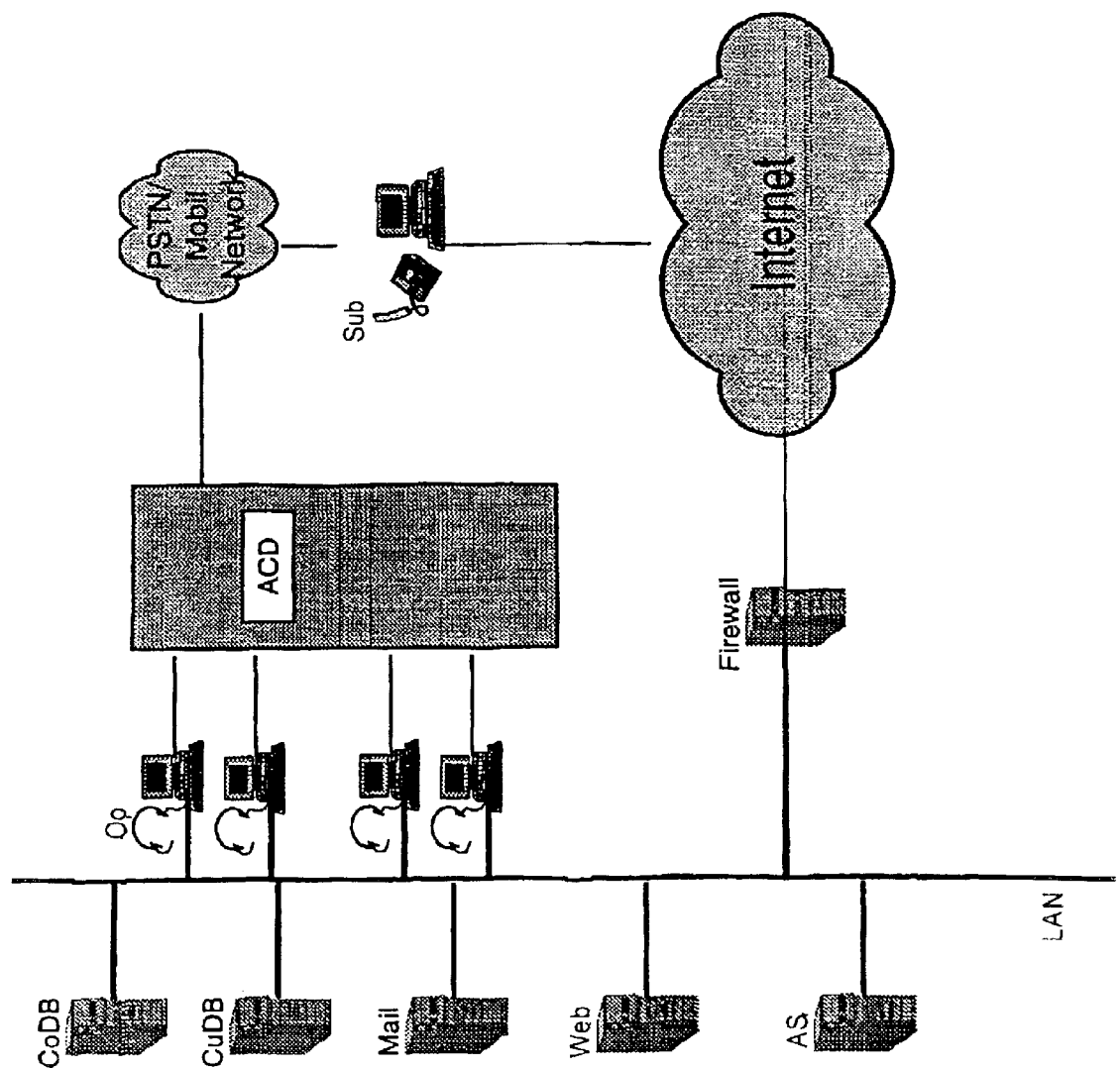

METHOD AND TELEPHONE AGENT SYSTEM FOR GENERATING A MESSAGE RECORD OF AT LEAST A PART OF A CONVERSATION BETWEEN TELEPHONE AGENTS AND FOR TRANSMITTING INFORMATION REGARDING THE MESSAGE RECORD TO THE TELEPHONE AGENT REQUESTING IT

This application claims the benefit of U.S. Provisional Application No. 60/314,044 filed on Aug. 22, 2001 and entitled: "Method and Telephone Agent System for Generating a Message Record of at Least a Part of a Conversation Between Telephone Agents and for Transmitting Information Regarding the Message Record to the Telephone Agent Who Has Requested It".

BACKGROUND OF THE INVENTION

The present invention relates to a method and a telephone agent system for use in a telecommunication network in which a call for conversation established between at least one calling telephone agent and at least one called agent is switched by a telephone agent system; e.g., a call center system serving a number of telephone agents.

At present there are call connections which are initiated respectively switched by a called operator agent using a telephone agent system which establishes a call for conversation between the calling telephone agent, such as a first subscriber, and the called telephone agent, such as a second subscriber or a service provider agent offering services to subscriber agents.

1. A first telephone agent calls one of the operator agents belonging to a telephone agent system and he/she requests a call connection to a second telephone agent, maybe in addition to at least a third telephone agent (a so-called conference call).
2. A first telephone agent calls the operator agent and he/she requests a call connection to a service provider agent offering the following information services; e.g., weather forecast, news, sport news, stock market news, traffic information, route planning information or maybe hotlines.

If the conversation held during the call with the operator agent or with the requested called telephone agent, as described before, is terminated, neither the calling telephone agent nor the operator agent involved in the conversation nor the called telephone agents involved in the conversation will be able to reproduce the whole, or at least a part, of the conversation among them. The facility to reproduce at least a part of the conversation between the calling telephone agent and the called telephone agent could be very helpful: if the telephone agent was not able to understand parts of the conversation or if the content of the conversation was complicated, he/she would be pleased to follow the conversation for a second time or, if necessary, for several times.

SUMMARY OF THE INVENTION

The present invention aims to provide a method and a telephone agent system for use in a telecommunication network which alleviates some or all of the above-mentioned problems.

Accordingly, in a first embodiment, the present invention provides a method for generating a message record of at least a part of the conversation held between the calling telephone agent and the called telephone agents during the call connected between them and for storing the message record in a database retrievable by request of the telephone agents. In addition, the present invention provides for transmitting information regarding the message record to a particular telephone agent who has requested the message record.

In a second embodiment, the present invention provides a telephone agent system which includes a message record unit that generates a message record of at least a part of the conversation held between the calling telephone agent and the called telephone agent during the call connected between them, a database in which the message record is storable and a transmitting unit that transmits information regarding the message record to a particular telephone agent who has requested the message record.

In the case that every telephone agent involved in the conversation has previously agreed, the step or the unit that generates the message record is allowed to be started.

Use of the present invention offers the advantage that telephone agents associated to a telephone agent system, preferably being customers of a call center, are able to receive the content of the conversation with the operator agent of the telephone agent system or the conversation they have had previously held with another telephone agent, preferably another customer, and which conversation as a call had been switched by the telephone agent system. In this way, the telephone agents can follow the before held conversation for at least a second time.

The message record of at least a part of the conversation is preferably stored in a computer sound file format. The message record in a sound file format can be, in addition, encoded for encryption and/or compression. The type of the sound file format can be chosen by the telephone agent or it is set as a default by the telephone agent system.

Preferably, before transmission, the message record is temporarily stored in a database which is coupled to the telephone agent system. Preferably, that database is located on a file server. The temporary storage has to be done until the particular telephone agent, who has requested the message record, has not yet received information regarding the message record. Because of the temporary storage, space consumption in resources is reduced.

In preferred embodiments of the present invention, the call for conversation can be established among different types of telephone agents:
1. Conversation held between a subscriber agent, such as a customer of a call center, having a terminal set connected to the telecommunication network, and a service provider agent, offering the following information: Weather forecast, route planning, stock market news, news, traffic information, Hotlines for customers.
2. Conversation held between a subscriber as mentioned before and an operator agent; e.g., an employee of a call center.
3. Conversation held among at least two subscriber agents who can be several calling and called subscribers; e.g., so-called conference call offering services to subscriber agents.

Preferably, the information regarding the message record is transmitted via electronic mail containing the message record as an attachment having a computer sound file format.

Furthermore, a Web-server includes the database storing the message record, wherein the information regarding the message record is transmitted via electronic mail containing a link to the Web-server.

Furthermore, a Web-server is linked to a database storing the message record, wherein the information regarding the message record is transmitted via electronic mail containing a link to the Web-server.

According to a further embodiment of the present invention, after expiration of a predetermined time period, the message record is removable/removed from the database after confirming removal to the telephone agent via electronic mail who has requested the message record.

The before-mentioned embodiments of the present invention offer the advantage that space consumption in resources can be reduced.

Furthermore it should be ensured that agreement (respectively, permission) has to be declared by every telephone agent involved in the conversation before generating the message record.

Preferably, a computer software product as a computer readable medium contains the message record, wherein the message record is generated in accordance with one of the before-mentioned methods.

Additional features and advantages of the present invention are described in, and will be apparent from, the following Detailed Description of the Invention and the Figures.

BRIEF DESCRIPTION OF THE FIGURES

FIG. 1 is a schematic diagram of a part of a telecommunication network including a telephone agent system according to the teachings of the present invention.

DETAILED DESCRIPTION OF THE INVENTION

FIG. 1 generally shows a telecommunication network including two different types of networks; e.g., a fixed telephone switching network PSTN or a mobile radio network and a packet based network like the "Internet." For easier understanding, the reference PSTN refers, in the following, to either a fixed telephone switching network or a "mobile" radio network.

Furthermore, a telephone agent system serves at least one telephone agent; e.g., a subscriber Sub connected via terminal equipment to the network PSTN and also connected via the same or other terminal equipment to the Internet. The terminal equipment is further coupled via a "Firewall"-Server to the Internet and is, in addition, coupled via an automatic call distribution system ACD to the network PSTN. The telephone agent system also includes a local area network LAN which is connected via operator agent terminal equipment Op. The automatic call distribution system ACD is coupled to the network PSTN and via the Firewall-Server to the Internet. Possibly, several servers like an application server AS, a Web-server Web, a mail server Mail, a customer database server CuDB and a conversation database server CoDB are coupled to the local area network LAN.

The following procedure concerning the present invention is contemplated:

A first telephone agent, such as a subscriber Sub being a customer of a call center which is associated to the shown telephone agent system, sets up a call to the automatic call distribution server forwarding that call to one of the terminal equipments Op belonging to an operator agent; e.g., an employee of the call center. The operator agent answers the call and puts it through to a requested second telephone agent, such as a subscriber, or he/she puts it through to several further telephone agents (so-called conference call), perhaps to a service provider agent providing services like weather forecast, traffic information, route planning, news, sport news, stock market news, hotline services, etc. The second telephone agent or agents are not shown in FIG. 1, but their location is easily imaginable. If the first telephone agent asks the operator agent for recording the conversation held with the second telephone agent or agents, then, after putting through the call, the operator agent will ask every second telephone agent or agents involved in the conversation for their agreement, or permission, regarding the message record of the conversation. In the case that every telephone agent involved in the conversation has agreed to recording the conversation, a software unit in the operator agent's terminal equipment starts generating the message record of the whole or at least a part of the conversation to which every telephone agent involved in the conversation has agreed before.

It is also possible that, instead of recording the conversation among the at least two telephone agents, the conversation between the calling telephone agent and the operator agent is recorded after agreement of both agents involved in the conversation.

The message record is stored in a database; e.g., the conversation database CoDB. The duration of the storage could be temporary. After termination of the conversation and/or of the call among the at least two telephone agents or between the calling telephone agent and the operator agent, information regarding the generated message record is transmitted to that telephone agent or agents who have requested it.

In a further embodiment of the present invention, the generated message record is transmitted to the telephone agent via electronic mail including the message record as an attachment. Due to this, the customer database server CuDB has to store the electronic mail addresses of the telephone agents being customers of the mentioned telephone agent system (respectively, call center). To obtain information regarding the customer's electronic mail address or to obtain charging information, the unit in the operator agent's terminal equipment has to access to the customer database server CuDB.

Preferably the record message is stored in a sound file format, perhaps in an encoded or compressed file format. A broad variety of well known file formats are possible. For example: Midi (.mid, that means the usual extension of the sound file), Real Audio (.ram or .ra), Wave (.wav), AVI (.avi), Mpeg1 (.mpg), Movie Mpg4 (.avi), Quick time (.mov), MP3 (.mp3) or MP4 (.mp4) files. The format of the sound file can be chosen by request of the telephone agent or it is set as a default by the telephone agent system.

In a further embodiment of the present invention, information regarding the generated message record is transmitted to the telephone agent via electronic mail including a link to an appropriate Web-Server (e.g., Web), which includes the message record itself or which is linked to the database (e.g., CoDB), storing the message record which can be downloaded.

This embodiment aims to avoid overloading of electronic mail systems due to a large number of electronic mails containing large attached sound files, and to alleviate the risk that the electronic mail system of a customer does not accept electronic mails containing such large attached sound files.

Possible downloading mechanisms are HTTP downloading or FTP downloading. The application server AS is responsible for a correct download process and an authorized access.

The main functions of the application server AS are:
Session management: Conversation to record, start and stop times of the recording: Communication with the telephone agent system for getting the information regarding all the telephone agents that are participating in the call: First telephone agent, operator telephone agent(s), second telephone agent, third telephone agent, . . . (in the case of conference call)

Record process: it can be possible that the AS is recording the conversation itself. It also can be possible that this recording function is a part of the call center or it is performed by an independent application.

Billing management: It provides the necessary information to the telephone agent system which performs billing the service.

Downloading

Authorization

If the telephone agent, who has requested the conversation recording, receives an electronic mail containing a link to a Web-server, the telephone agent can download the message record by clicking to the link.

The telephone agent perhaps has to enter a customer's identification code and a password before the download process will be started. If the message record is downloaded, the database (e.g., CoDB), will be able to remove the message record or it will keep it. It is also possible that the message record is removed from the database automatically after expiration of a predetermined time period.

Although the present invention has been described with reference to specific embodiments, those of skill in the art will recognize that changes may be made thereto without departing from the spirit and scope of the present invention as set forth in the hereafter appended claims.

What is claimed is:

1. A method for generating a message record in case of call termination during a call for use in a telecommunication network, wherein the call sets up a conversation established between at least one calling telephone agent and at least one called telephone agent is switched by a telephone operator agent system which services a plurality of telephone agents, the method comprising the steps of:

generating a message record of at least a part of the conversation between the at least one calling telephone agent and the at least one called telephone agent during the call, wherein agreement by every telephone agent involved in the conversation is established prior to generating the message record, wherein at least part of the conversation could not be understood;

storing the message record in a database retrievable upon a request by at least one of the plurality of telephone agents; and transmitting information regarding the message record to the at least one telephone agent who has requested the message record, such that in the case of call termination during the call, at least a part of the conversation is reproducible by at least one of the telephone agents to follow the conversation that could not be understood a second time.

2. A method for generating a message record for use in a telecommunication network as claimed in claim 1, the method further comprising the step of storing the message record in a computer sound file format.

3. A method for generating a message record for use in a telecommunication network as claimed in claim 1, the method further comprising the step of encoding the message record for encryption/compression.

4. A method for generating a message record for use in a telecommunication network as claimed in claim 1, the method further comprising the step of storing the message record temporarily in the database before transmission.

5. A method for generating a message record for use in a telecommunication network as claimed in claim 1, wherein the conversation is established between a subscriber agent, which includes a terminal set connected to the telecommunication network, and a service provider agent supporting at least one telephone agent system within the telecommunication network.

6. A method for generating message record for use in a telecommunication network as claimed in claim 1, wherein the conversation is established between a subscriber agent, which includes a terminal set connected to the telecommunication network, and an operator agent offering services to subscriber agents.

7. A method for generating a message record for use in a telecommunication network as claimed in claim 1, wherein the conversation is established among at least two subscriber agents, each of which includes a terminal set connected to a telecommunication network.

8. A method for generating a message record for use in a telecommunication network as claimed in claim 1, the method further comprising the step of transmitting the information regarding the message record via electronic mail containing the message record as an attachment having a computer sound file format.

9. A method for generating a message record for use in a telecommunication network as claimed in claim 1, wherein a Web-server includes the database storing the message record, with the information regarding the message record being transmitted via electronic mail containing a link to the Web-server.

10. A method for generating a message record or use in a telecommunication network as claimed in claim 1, wherein a Web-server is linked to the database storing the message record, with the information regarding the message record being transmitted via electronic mail containing a link to the Web-server.

11. A method for generating a message record for use in a telecommunication network as claimed in claim 1, the method further comprising the step of removing the message record from the database, after expiration of a predetermined time period, after confirming removal to the telephone agent via electronic mail.

12. A method for generating a message record for use in a telecommunication network as claimed in claim 1, the method further comprising the step of transmitting the information regarding the message record via electronic mail to the at least one telephone agent who has requested the message record, prior to terminating the call.

13. A method for generating a message record for use in a telecommunication network as claimed in claim 1, wherein the message record is stored on a computer readable medium.

14. A telephone agent system used for establishing a call that sets up a conversation between at least one calling telephone agent and at least one called telephone agent within a telecommunication network and serving a plurality of telephone agents, wherein at least a part of the conversation cannot be understood by at least one of the telephone agents and the call is terminated during the call, the system comprising:

a message recording unit for generating a message record of at least a part of the established conversation during the call, wherein the recording unit receives a message transmitted by every telephone agent involved in the conversation in order to establish agreement prior to generating the message record;

a database in which the message record is storable, and wherein the message record is retrievable upon a request by at least one of the plurality of telephone agents; and a transmitting unit for transmitting information regarding the message record to the at least one telephone agent who has requested the message record such that the call is reproducible by said one of the telephone agents in order to follow the conversation that included parts that could not be understood a second time after termination during the call.

15. A telephone agent system as claimed in claim 14, further comprising a computer sound file containing the message record in a computer sound file format.

16. A telephone agent system as claimed in claim 14, further comprising a computer encoded file containing the message record in a computer encrypted/compressed format.

17. A telephone agent system as claimed in claim 14, wherein the database stores the message record temporarily before transmission.

18. A telephone agent system as claimed in claim 14, wherein the conversation is established between a subscriber agent, including a terminal set connected to the telecommunication network, and a service provider agent supporting at least one telephone agent system within the telecommunication network.

19. A telephone agent system as claimed in claim 14, wherein the conversation is established between a subscriber agent, including a terminal set connected to the telecommunication network, and an operator agent offering services to subscriber agents.

20. A telephone agent system as claimed in claim 14, wherein the conversation is established among at least two subscriber agents, each of which includes a terminal set connected to the telecommunication network.

21. A telephone agent system as claimed in claim 14, wherein the transmitting unit transmits the information regarding the message record via electronic mail containing the message record as an attachment having a computer sound file format.

22. A telephone agent system as claimed in claim 14, further comprising a Web-server which includes the database storing the message record, with the information regarding the message record being transmittable via electronic mail containing a link to the Web-server.

23. A telephone agent system as claimed in claim 14, further comprising a Web-server linked to a database which includes the database storing the message record, with the information regarding the message record being transmittable via electronic mail containing a link to the Web-server.

24. A telephone agent system as claimed in claim 14, wherein, after expiration of a predetermined time period, the message record is removable from the database after confirming removal to the telephone agent via electronic mail.

25. A telephone agent system as claimed in claim 14, wherein the transmitting unit transmits the information regarding the message record via electronic mail to the at least one telephone agent who has requested the message record, prior to terminating the call.

* * * * *